(No Model.)

J. J. SCHOLFIELD.
SPLIT PULLEY OR WHEEL.

No. 470,952. Patented Mar. 15, 1892.

WITNESSES.                                INVENTOR
Chas. F. Schmelz                          Joseph J. Scholfield
Daniel M. Chapp                           per S. Scholfield
                                          Attorney

THE NORRIS PETERS CO., PHOTO-LITHO., WASHINGTON, D. C.

UNITED STATES PATENT OFFICE.

JOSEPH J. SCHOLFIELD, OF PROVIDENCE, RHODE ISLAND.

SPLIT PULLEY OR WHEEL.

SPECIFICATION forming part of Letters Patent No. 470,952, dated March 15, 1892.

Application filed December 14, 1891. Serial No. 415,043. (No model.)

*To all whom it may concern:*

Be it known that I, JOSEPH J. SCHOLFIELD, a citizen of the United States, residing at Providence, in the State of Rhode Island, have invented a new and useful Improvement in Split Pulleys or Wheels, of which the following is a specification.

The nature of my invention consists in the improved construction of the split pulley or wheel, whereby the wheel may be readily secured upon a continuously-running shaft, thus obviating the necessity for stopping the factory, as usual, to place a pulley or other wheel in position upon the shaft, or whereby the wheel may be readily secured to a shaft in a machine without necessitating the removal of the shaft from its bearings.

Figure 2:
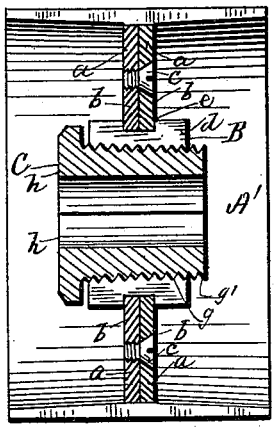
Figure 3:
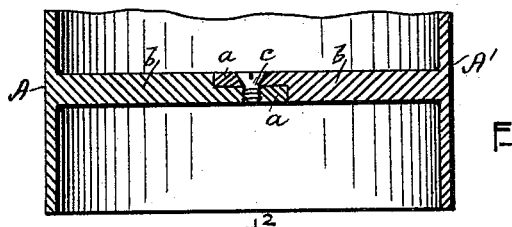
Figure 1:
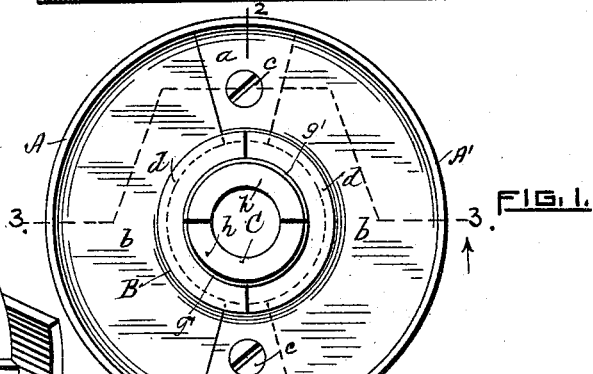
Figure 4:
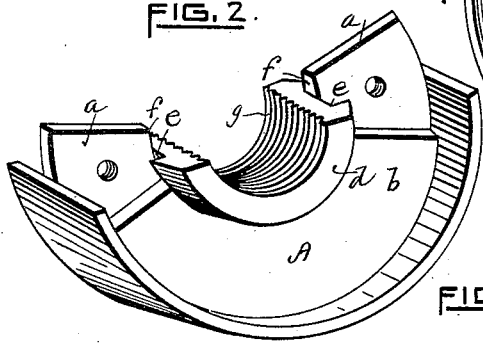
Figure 5:
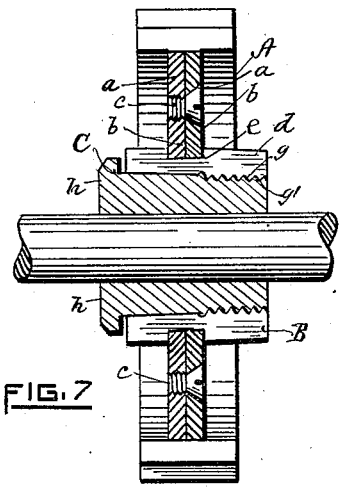
Figures 6, 7:
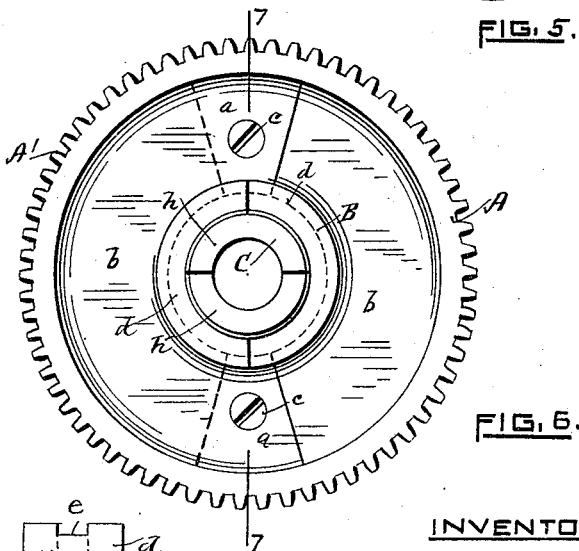
Figure 8:
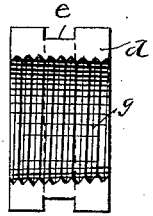

Figure 1 represents a side elevation of a split pulley embodying my improvement. Fig. 2 represents an axial section of the same, taken in the line 2 2 of Fig. 1. Fig. 3 represents a section taken in the line 3 3 of Fig. 1. Figs. 4 and 5 represent perspective views of portions of the pulley shown in Fig. 1. Fig. 6 represents the side view of a gear-wheel embodying my improvement. Fig. 7 represents a vertical section of the same, taken in the line 7 7 of Fig. 6. Fig. 8 represents a detail view of one portion of the separable parts of the hub or outer bushing of the wheel shown in Figs. 1 and 2.

In the accompanying drawings, A, Figs. 1, 2, and 3, represents one semicircular section of a pulley made in separable parts, and A′ the opposite section, the thinned portion $a$ of the web $b$ of the section A being made to overlap the thinned portion $a$ of the web $b$ of the opposite section A′ and the said thinned webs may be held together by means of the screws $c$ $c$ or otherwise. The hub or outer bushing B is formed in two semicircular parts $d$ $d$, which are preferably cast with an outer groove $e$, having either a circular or angular bottom, tending to prevent the slipping of the parts and adapted to receive the edge $f$ of the web $b$ of either of the sections A A′, and with an interior screw-thread $g$, which, in connection with the screw-thread $g$ of the opposite part $d$, will form a complete nut. The inner bushing C is also made in two semicircular and slightly-conical parts $h$ $h$, which are cast with an external screw-thread $g'$, adapted to fit the interior screw-thread $g$ of the parts $d$ $d$ of the hub B, the said parts $h$ $h$ being preferably made with a taper, so that when the said parts are placed upon the shaft and screwed into the parts $d$ $d$ of the hub or outer bushing the pulley will be tightly secured to the shaft by the wedging action of the parts $h$ $h$ of the bushing C.

A gear-wheel embodying my improvement is shown in Figs. 6 and 7, in which the hub B is made of divided construction and provided with the groove $e$, adapted to receive the web $b$ of the parts A A′ of the gear, and with the interior screw-thread $g$, which is adapted for engagement with the screw-thread $g'$ of the parts $h$ $h$ of the bushing C, the said bushing being made in conical form to fit the conical bore of the divided hub B, thus serving to hold the gear firmly in its position upon the shaft.

Instead of the screws $c$ $c$, two studs, which may be secured to the web of one of the sections and enter corresponding perforations made in the web of the opposite section, may be employed for preventing the separation of the said sections from each other when held in the groove $e$ of the parts $d$ $d$ of the hub or outer bushing B.

The outer split bushing $d$ having been claimed, broadly, without restriction to the outer groove $e$ in my pending application, Serial No. 418,200, filed January 15, 1892, I therefore make no broad claim to the same in this specification, but only to the same when provided with the said outer groove to receive the web of the wheel-segments.

I claim as my invention—

In a split pulley or wheel, the combination, with the outer separable parts suitably held together, of the hub or outer bushing made in separable parts provided transversely with an outer groove adapted to receive the web or inner portion of the outer parts and with an interior screw-thread, and the inner bushing made in separable parts provided with an external screw-thread adapted to fit the internal screw-thread of the parts of the hub or outer bushing, substantially as described.

JOSEPH J. SCHOLFIELD.

Witnesses:
SOCRATES SCHOLFIELD,
CHAS. F. SCHMELZ.